United States Patent [19]

Grow

[11] 4,026,500
[45] May 31, 1977

[54] AIRCRAFT WING WITH INTERNAL FLOW CONTROL PROPULSION

[75] Inventor: Harlow B. Grow, Pacific Palisades, Calif.

[73] Assignees: Mark S. Grow, El Cajon; Bonnie B. Madden, Palo Alto; Michael J. Grow, El Cajon, all of Calif. ; part interest to each

[22] Filed: June 5, 1975

[21] Appl. No.: 583,978

[52] U.S. Cl. .................................. 244/36; 244/53 R
[51] Int. Cl.² ..................... B64C 3/02; B64D 27/18
[58] Field of Search ............... 244/36, 34, 53 R, 54, 244/55, 42 CF, 12 R, 15, 52, 110 B; 60/248

[56] References Cited

UNITED STATES PATENTS

| | | | |
|---|---|---|---|
| 2,526,941 | 10/1950 | Fishbein | 244/53 R X |
| 2,620,622 | 12/1952 | Lundberg | 244/110 B X |
| 2,748,564 | 6/1956 | Marchal et al. | 60/248 |
| 2,821,351 | 1/1958 | Utgoff | 244/42 CF X |
| 2,978,204 | 4/1961 | Davidson | 244/12 R X |
| 3,482,804 | 12/1969 | Pyptiuk | 244/53 R |

FOREIGN PATENTS OR APPLICATIONS

| | | | |
|---|---|---|---|
| 1,426,852 | 12/1965 | France | 244/55 |
| 186,279 | 11/1963 | Sweden | 244/53 R |
| 504,539 | 4/1939 | United Kingdom | 244/53 R |

*Primary Examiner*—Trygve M. Blix
*Assistant Examiner*—Barry L. Kelmachter

[57] ABSTRACT

A jet thrust aircraft wing wherein the intake and exhaust are substantially coextensive with the leading and trailing edges, respectively; utilizing engine suction to induce intake of air and preventing build-up ahead of the wing by separating the same from the flow of air over and under the upper and lower wing surfaces; and utilizing engine exhaust thrust to induce controllable air flow through the wing and to induce longitudinal flow of air over and under the wing throughout its span.

10 Claims, 6 Drawing Figures

AIRCRAFT WING WITH INTERNAL FLOW CONTROL PROPULSION

BACKGROUND

It is generally accepted that an aircraft wing must have span with commensurately moderate chord and thickness, for both aerodynamic and structural reasons. Aerodynamically, lift is achieved by having an upper surface of greater length than the lower surface, and to the end that negative and positive pressures are applied. Structural strength is then achieved by utilizing the thickness necessitated by the disproportionate oppositely curved upper and lower surfaces to accommodate a spar or beam. Throughout the past, aircraft have been designed with concentrated weight application and thrust points with respect to the supporting wing, necessitating heavy wing structures to cope with the developed forces. That is, ordinary aircraft have central fuselages from which the wings are cantilevered and the useful load carried by the root or center section structure that is highly stressed; although it is recognized that such items as fuel cells and the like can be advantageously distributed throughout the wing. Also, ordinary aircraft have forward thrust as well as the weight of each engine applied at localized centers. These considerations of applied loads have also required heavy wing structures wherein thickness of the wing has been minimized for speed performance by reducing the frontal area pressures. Consequently, wings are normally of thin cross section with structures sufficient to support an external fuselage and external engine units or thrust pods; and all of which establishes the aforesaid concentrations of applied loading. Therefore, it is a general object of this invention to provide an aerodynamic and structural integration of aircraft components combined within a wing and wherein the applied loads are distributed throughout the wing span.

The intake of air into jet thrust engines has been accommodated by localized air scoop and slot openings, and generally with the least change possible to the aerodynamics of the fuselage or wing involved. In other words, air induction into jet thrust engines has not been utilized to advantageously affect the lift at the wing surfaces. With the present invention it is an object to advantageously utilize the suction effect of a jet thrust engine to create separate air flows with respect to both the upper and lower wing surfaces, thereby taking mutually effective support from the upper and lower air flows while utilizing the ram air effect from the air ahead of the wing. In effect there is provided two leading edges of disproportionately smaller frontal area as compared with the leading edge of a conventional wing of the same thickness.

An object of this invention is to totally utilize the movement of air through and over (and under) a wing, wherein all air necessary for engine propulsion is advantageously employed to divert the mutually effective air flows over and under the wing surfaces that are separated by both the intake and exhaust slots as hereinafter described. With the present invention, the induced air between the upper and lower leading edges of the intake slot is utilized by the thrust engine or engines, with single flow engines or by-pass engines.

Another object of this invention is to provide an aircraft wing wherein the total exhaust is advantageously utilized between the trailing edges of the slot nozzle and also forwardly thereof from discharge openings over and/or under controlling surfaces. It is contemplated that fan jet thrust engines be employed with the hot exhaust gases confined to discharge through the trailing edge slot, and with heated cooling air normally embracing the hot exhaust gases within the slot for attitude and shock wave control, and the slot nozzle adjusted for fast high thrust flight, and diverted by wing flaps or the like for slow low thrust flight.

It is still another object of this invention to provide a thrust means by which boundary layer air is induced to flow longitudinally, regardless of swept and/or delta wing configurations, over the wing chord without the aid of fences and rails or rudders. With the present invention there is the concentration of high speed gases flowing between the coextensive trailing edges of the upper and lower wing surfaces, and this induces longitudinal flow over and under the wing.

In accordance with the foregoing objectives, it is also an object to provide a wing structure wherein there is a multiplicity of jet thrust engines, each of which is manifolded to serve complementary leading and trailing edge portions of the wing. Further, it is an object to provide a wing of increased total thickness, but with reduced effective frontal area at the upper and lower leading edges of the intake slot. Together, these objectives provide for a high strength wing structure with applied loads distributed throughout the span. And still further, the separation of upper and lower wing surfaces with the propulsion flow therebetween provides for the accommodation of the propulsion engines and passenger and/or pay load substantially without alteration of the wing surfaces or disturbance of the boundary layer air and all to the end that a most efficient aircraft wing results.

SUMMARY OF INVENTION

The aircraft wing as it will be described can be self-sufficient as a flying wing aircraft, or it may be incorporated with a conventional fuselage, as circumstances require. However, the characteristic features of this wing remain, generally, the separation of air flow over and under the wing by means of a slotted leading edge and a slotted trailing edge, both substantially coextensive with the wing span and between which the propulsion flow is ducted through suitable jet thrust engines. Control of the wing per se is by conventional means at the leading and mainly at the trailing edge (upper and lower) and by trim of the jet thrust and including those aircraft components known as elevators, ailerons, elevons, flaps and spoilers, and any modifications thereof. Also, balance and trim can be effected by the placement of immoveable and/or by the repositioning of moveable loads.

DRAWING

The various objects and features of this invention will be fully understood from the following detailed description of the typical preferred form and application thereof, throughout which description reference is made to the accompanying drawings, in which:

FIG. 1 is a plan view of the wing.

FIGS. 2 and 3 are front and rear views of the wing shown in FIG. 1 and taken as indicated by lines 2—2 and 3—3 on FIG. 1, respectively.

PREFERRED EMBODIMENT

Figure 1:
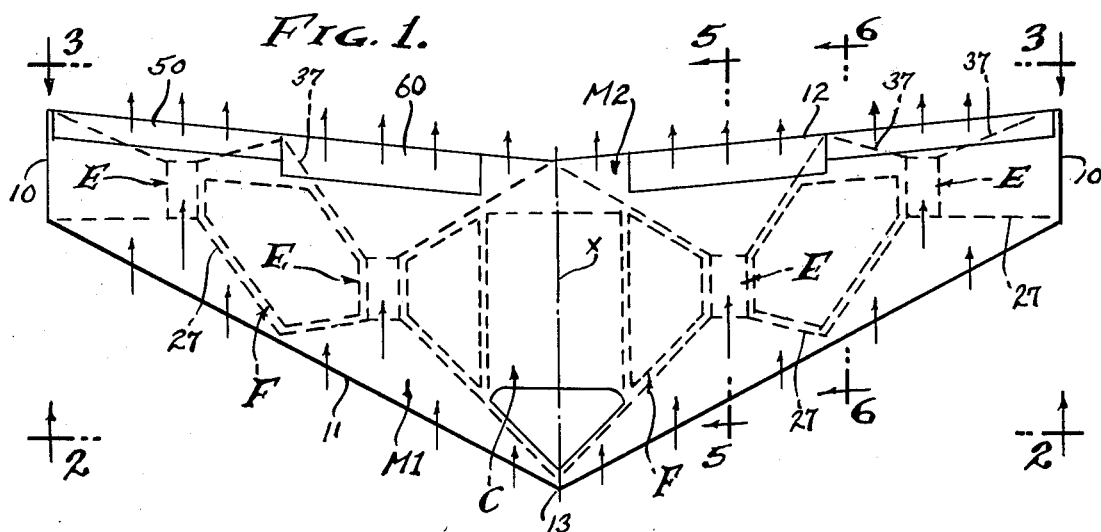

Referring to FIG. 1 of the drawings, the wing per se is illustrated without a conventional fuselage and empenage. Generally, the span of the wing is from tip 10 to tip 10, there being a leading edge 11 and a trailing edge 12 coextensive with the wing span. The plan view of FIG. 1 shows a swept wing configuration, although straight wing configurations are equally applicable to this invention, as a flying wing aircraft is most practical to the concept herein disclosed. As shown therefore, the craft has a nose 13 established by the apex of the divergent right and left leading edges 11, and has similarly divergent right and left trailing edges 12 (a delta wing is feasible). It is preferred that the wing be tapered toward the tips 10 which are parallel to the line of flight. The center axis x—x extends through the nose apex and convergence of the trailing edge, also parallel to the line of flight.

Figure 4:
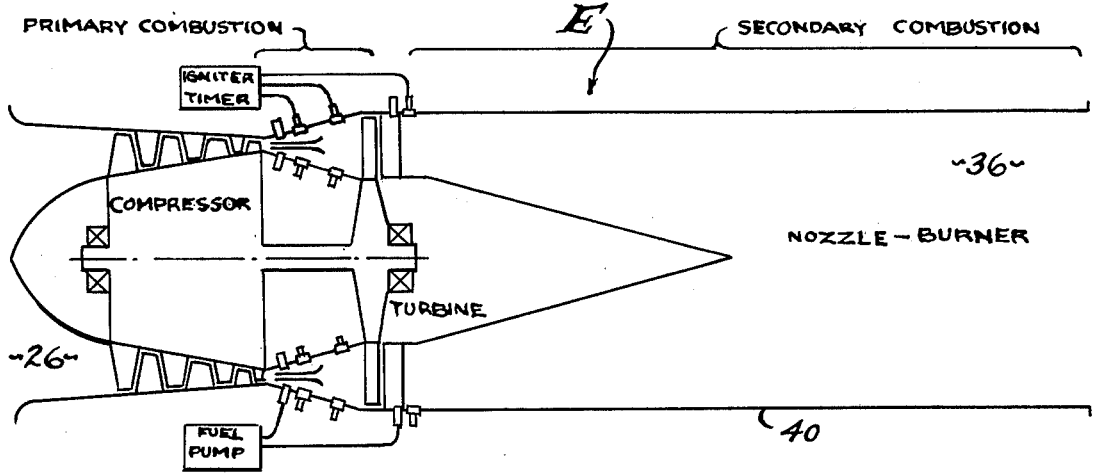
FIG. 4 is a longitudinal sectional view of the preferred aero thrust engine employed for thrusting the wing.
Figure 5:
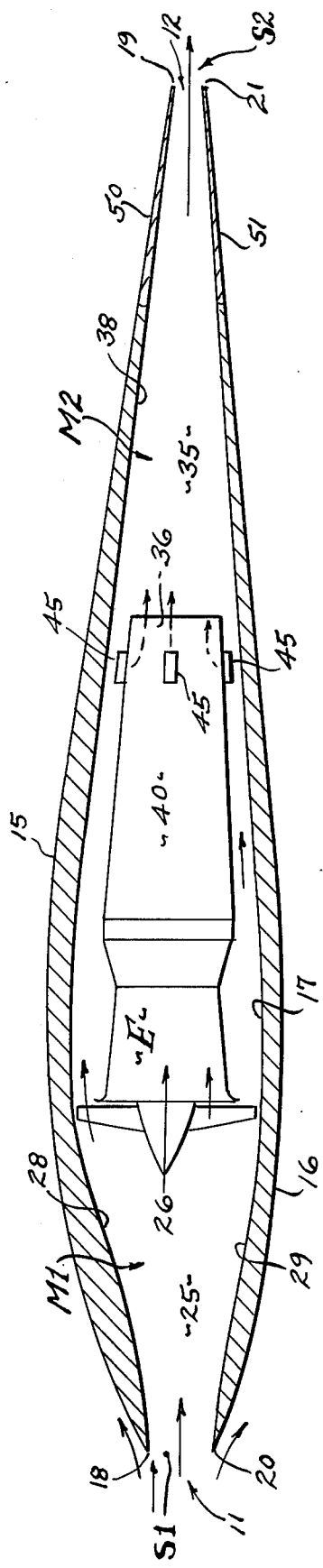
FIG. 5 is an enlarged longitudinal sectional view taken as indicated by line 5—5 on FIG. 1.

In carrying out this invention, one or more propulsion engines E are employed and preferably a multiplicity of engines E are employed to service the entire wing span. As shown in FIG. 4, a thrust producing gas turbine adapted for aircraft propulsion at both moderate and especially high thrust values is employed as disclosed in my co-pending application Ser. No. 411,092 filed Oct. 30, 1973 entitled "REACTION MOTOR EMPLOYING INTERMITTENT EXPLOSIVE COMBUSTION AND IMPULSE TURBINE" and issued as U.S. Pat. No. 3,898,801 dated Aug. 12, 1975. This preferred engine is characterized by intermittent explosive burning of fuel into the working fluid and the directing thereof into an impulse turbine for the partial absorption of energy by means of a decrease in velocity and for the conservation of pressure for continued and subsequent effective burning. The engine embodiment comprises a compressor section followed by a nozzle-burner section shaped for the explosive high pressure high velocity discharge of working fluid into the turbine section for the absorption of operating energy and conservation of pressure, and through which the working fluid exhausts through stator blades that re-establish axial flow and thrust; the working fluid completing its combustion and/or being injected with fuel for efficient after burning. The compressor air is stratified as it passes through the nozzle-burner section for cooling effect and to supply the products of combustion for supporting complete primary and secondary burning. As shown in FIG. 5, a ducted fan 14 by-passes over the engine or engines.

In accordance with this invention, there is an intake manifold M1 substantially coextensive with the leading edge 11 (right and left), and there is an exhaust manifold M2 substantially coextensive with the trailing edge 12 (right and left). The manifolds M1 and M2 have plenums that are complementary in that they service common engines E, to the end that each engine with its associated manifold plenums is self-sufficient. In practice, the engines E are spaced along the wing span with areas therebetween for the accommodation of fuel cells F, landing gear and accessories; the center portion between inboard engines being reserved for the pilot and passenger or pay load compartment C. A feature is the substantially coextensive intake and exhaust of air throughout the wing span, and the adjacent continuity of air flow provided by the multiplicity of manifolds M1 and M2.

Figure 2:
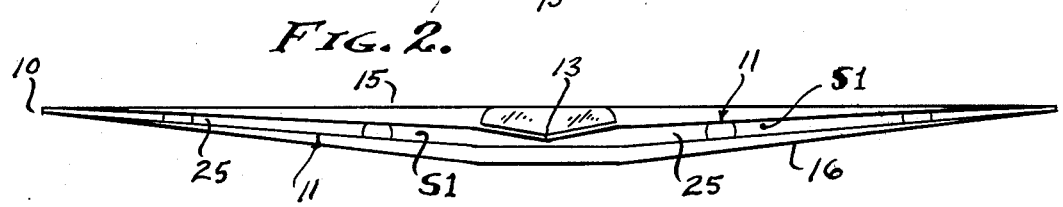
Figure 3:
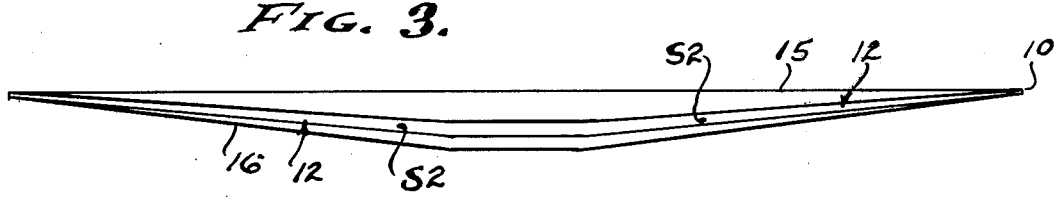

Referring now to FIGS. 2 and 3 of the drawings, coextensive intake and exhaust slots S1 and S2 are shown to pass air through the wing for operation of the engines E. In carrying out this invention, the slots establish a separation of the wing structure into upper and lower air foils 15 and 16 with propulsion air flowing therebetween. The camber of the upper air foil 15 is longer than the lower air foil 16 for lift as circumstances require, and the said foils have inner surfaces 17, respectively, establishing ducts which house the engines E. Thus, the upper air foil 15 has leading and trailing edges 18 and 19 separate and spaced from the leading and trailing edges 20 and 21 of the lower air foil 15 (see FIGS. 5 and 6). And, these two air foils are acutely tapered, having relatively sharp leading edges 18 and 20 and extremely sharp trailing edges 19 and 21, and of shallow cross section as compared with the total thickness of the wing.

Figure 6:
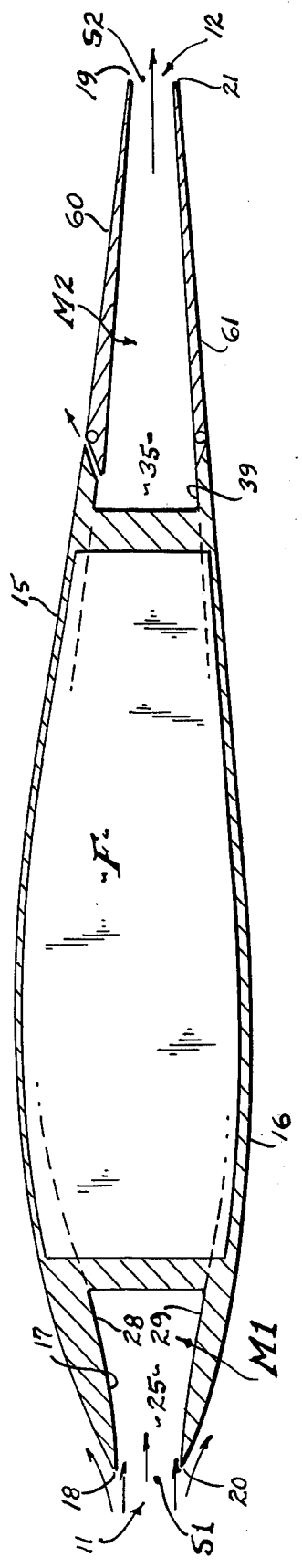
FIG. 6 is an enlarged longitudinal sectional view taken as indicated by line 6—6 on FIG. 1.

Referring now to the intake manifolds M1 each of said manifolds is comprised of one or more and preferably a multiplicity of convergent plenums 25 open from the intake slot S1 to the inlet 26 of each propulsion engine E. In practice, the inlet 26 is a circular duct that surrounds a compressor or fan as shown in FIG. 4, the plenum having convergent side walls 27 as shown in FIG. 1, and divergent upper and lower walls 28 and 29 as shown in FIGS. 5 and 6. In accordance with this invention, there is the transition of air flow from a continuing span-wise slot S1 between the leading edges 18 and 20 to the localized inlet 26 positioned within the wing rearward of the said leading edges. As shown in FIG. 1 there is a multiplicity of plenums 25, one immediately adjacent another and laterally separating the flow of air entering through slot S1, there being a continuous span-wise intake slot serving the multiplicity of manifold plenums.

Referring now to the exhaust manifold M2, said manifold is comprised of one or more and preferably a multiplicity of divergent plenums 35 open from the outlet 36 of each propulsion engine E to the exhaust slot S2. In practice, the outlet 36 is a circular duct that surrounds a turbine wheel as shown, the plenum having divergent side walls 37 as shown in FIG. 1, and convergent upper and lower walls 38 and 39 as shown in FIGS. 5 and 6. In accordance with this invention, there is the transition of air flow from the outlet 36 to the continuing span-wise slot S2 between the trailing edges 19 and 21. As shown in FIG. 1 there is a multiplicity of manifold plenums 35, one immediately adjacent another and laterally separating the flow of air exhausting through the slot S2, there being a continuous span-wise exhaust slot serving the multiplicity of manifold plenums.

When employing a bypass type of propulsion engine E, or externally cooled engine as illustrated in FIG. 5, the exhaust nozzle 40 which transports hot gases is a laterally divergent stack around which the cooling air is circulated rearwardly to protect the wing structure, the exhaust aperture of which is substantially coextensive with the lateral span-wise extent of plenum 35 at the slot S2. After burners 45 are provided in the annulus surrounding the nozzle 40 so as to heat the cooling air for thermal control having its effect on attitude of the wing and suppression of shock waves.

Aerodynamic configurations of this wing can be altered as hereinabove specified and for example as shown in FIGS. 5 and 6 of the drawings. Upper and lower ailerons or the like 50 and 51 are provided to change the effect of the upper and lower air foils 15 and 16, while maintaining separation of the exterior and interior flows of air (see FIG. 5). Upper and lower flaps or the like 60 and 61 are provided to change the effect of the upper and lower air foils 15 and 16 while simultaneously bleeding off fan or bypass air for discharge (see FIG. 6) over the flaps, the greater the angular displacement the greater the bleed off discharge for boundary layer control. Alternately, any valve means can be employed to discharge bleed off air to the exterior of the wing and ahead of the trailing edges, top and/or bottom.

From the foregoing it will be seen that a highly efficient and structurally sound wing is provided for utilizing the propulsive effect of jet thrust engines wherein the intake and exhaust is substantially coextensive of the leading and trailing edges. Characteristically, there is the separation of three layers of air that flow longitudinally of upper and lower air foils which establish the lift cambers and flow passage for engine operation. In effect, all air passing by and through the wing is usefully employed and the build up of air ahead of the wing is substantially eliminated and/or reduced by virtue of the minimized frontal area of the acutely tapered upper and lower air foils which maintain the separation of air for lift and propulsion respectively.

Having described only a typical preferred form and application of my invention, I do not wish to be limited or restricted to the specific details herein set forth, but wish to reserve to myself any modifications or variations that may appear to those skilled in the art:

I claim:

1. A jet thrust aircraft wing comprised of upper and lower air foils and each of said air foils having upper and lower external surfaces extending between spaced leading and trailing edges and extending coextensively with the wing span, a propulsion air duct between and formed by the lower external surface of the upper air foil and the upper external surface of the lower air foil to extend between intake and exhaust slots coextensive with said leading and trailing edges and continuous without interruption between the wing tips, a jet thrust engine disposed within the propulsion air duct of the wing, laterally convergent intake plenum walls in open communication between said intake slot and the engine, and laterally divergent exhaust plenum walls in open communication between the engine and said exhaust slot, whereby propulsion air separates air flow over and under the upper and lower air foils coextensively of the wing span.

2. The jet thrust wing as set forth in claim 1, wherein moveably positionable trailing edges comprise valve means to discharge air flow to the exterior of and rearwardly over the wing from the propulsion air duct ahead of the said trailing edge of the wing.

3. The jet thrust wing as set forth in claim 1, wherein the jet thrust engine is of the type which passes air over an exhaust nozzle, said exhaust nozzle being divergent and in spaced relation from the divergent exhaust plenum walls, and wherein valve means discharges air flow to the exterior of and rearwardly over the wing from the propulsion air duct ahead of the trailing edge of the wing.

4. The jet thrust wing as set forth in claim 1, wherein the jet thrust engine is of the intermittent explosive combustion and impulse turbine type comprising; an intake suction and compressor means followed by a nozzle-burner means shaped for explosive high pressure high velocity discharge of working fluid into a turbine means for the absorption of energy by decrease in velocity and conservation of pressure, means for intermittent burning of fuel into the working fluid and for velocity decrease thereof in the turbine means and with a laterally divergent exhaust nozzle for hot gas thrust in spaced relation from the inner walls of the propulsion air duct and divergent exhaust plenum walls thereof for the protective discharge of cooling air around said nozzle.

5. The jet thrust wing as set forth in claim 1, wherein the jet thrust engine is of the intermittent explosive combustion and impulse turbine type comprising; an intake suction and compressor means followed by a nozzle-burner means shaped for explosive high pressure high velocity discharge of working fluid into a turbine means for the absorption of energy by decrease in velocity and conservation of pressure, means for intermittent burning of fuel into the working fluid and for velocity decrease thereof in the turbine means and subsequent after burning in spaced relation from the inner walls of the propulsion air duct and the divergent exhaust plenum walls thereof for the protective discharge of the jet thrust.

6. A multi engine jet thrust aircraft wing comprised of upper and lower air foils and each of said air foils having upper and lower external surfaces extending between spaced leading and trailing edges and extending coextensively with the wing span, a propulsion air duct between and formed by the lower external surface of the upper air foil and the upper external surface of the lower air foil to extend between intake and exhaust slots coextensive with said leading and trailing edges and continuous without interruption between the wing tips, a multiplicity of jet thrust engines spaced along the wing span and disposed within the propulsion air duct of the wing, an intake manifold within the propulsion duct of the leading edge of the wing and comprised of laterally adjacent and convergent plenum walls in open communication between the said intake slot and each engine, and an exhaust manifold within the propulsion duct at the trailing edge of the wing and comprised of laterally adjacent and divergent plenum walls in open communication between each engine and said exhaust slot, whereby propulsion air separates air flow over and under the upper and lower air foils coextensively of the wing span.

7. The multi engine jet thrust aircraft wing as set forth in claim 6, wherein moveably positionable trailing edges comprise valve means to discharge air flow to the exterior of and rearwardly over the wing from the propulsion air duct ahead of the said trailing edge of the wing.

8. The multi engine jet thrust aircraft wing as set forth in claim 6, wherein the jet thrust engines are of the type which pass air over exhaust nozzles, said exhaust nozzles being divergent and in spaced relation from the divergent exhaust plenum walls, and wherein valve means discharges air flow to the exterior of and rearwardly over the wing from the propulsion air duct ahead of the trailing edge of the wing.

9. The multi engine jet thrust aircraft wing as set forth in claim 6, wherein the jet thrust engines are of the intermittent explosive combustion and impulse turbine type comprising; an intake suction and compressor means followed by a nozzle-burner means shaped for explosive high pressure high velocity discharge of working fluid into a turbine means for the absorption of energy by decrease in velocity and conservation of pressure, means for intermittent burning of fuel into the working fluid and for velocity decrease thereof in the turbine means and with laterally divergent exhaust nozzles for hot gas thrust and extending therefrom in spaced relation from the inner walls of the propulsion air duct and the divergent exhaust plenum walls thereof for the protective discharge of cooling air around said nozzles.

10. The multi engine jet thrust aircraft wing as set forth in claim 6, wherein the jet thrust engines are of the intermittent explosive combustion and impulse turbine type and each comprising; an intake suction and compressor means followed by a nozzle-burner means shaped for explosive high pressure high velocity discharge of working fluid into a turbine means for the absorption of energy by decrease in velocity and conservation of pressure, means for intermittent burning of fuel into the working fluid and for velocity decrease thereof in the turbine means and subsequent after burning in spaced relation from the inner walls of the propulsion air duct and the divergent exhaust plenum walls thereof for the protective discharge of the jet thrust.

* * * * *